(12) United States Patent
Marker et al.

(10) Patent No.: US 7,999,143 B2
(45) Date of Patent: Aug. 16, 2011

(54) PRODUCTION OF DIESEL FUEL FROM RENEWABLE FEEDSTOCKS WITH REDUCED HYDROGEN CONSUMPTION

(75) Inventors: Terry L. Marker, Palos Heights, IL (US); Peter Kokayeff, Naperville, IL (US); Giovanni Faraci, San Donato Milanese (IT); Franco Baldiraghi, Melegnano (IT)

(73) Assignees: UOP LLC, Des Plaines, IL (US); ENI S.p.A., Rome (IT)

( * ) Notice: Subject to any disclaimer, the term of this patent is extended or adjusted under 35 U.S.C. 154(b) by 386 days.

(21) Appl. No.: 12/193,161

(22) Filed: Aug. 18, 2008

(65) Prior Publication Data

US 2009/0077867 A1 Mar. 26, 2009

Related U.S. Application Data

(60) Provisional application No. 60/973,818, filed on Sep. 20, 2007.

(51) Int. Cl.
*C07C 4/00* (2006.01)
*C07C 5/13* (2006.01)
(52) U.S. Cl. ......... 585/240; 585/242; 585/362; 585/733
(58) Field of Classification Search .................. 585/240, 585/242, 362, 733, 250
See application file for complete search history.

(56) References Cited

U.S. PATENT DOCUMENTS

| | | | |
|---|---|---|---|
| 5,186,722 A | 2/1993 | Cantrell et al. | |
| 5,705,722 A * | 1/1998 | Monnier et al. | 585/240 |
| 7,232,935 B2 | 6/2007 | Jakkula et al. | |
| 7,279,018 B2 | 10/2007 | Jakkula et al. | |
| 7,425,657 B1 | 9/2008 | Elliott et al. | |
| 7,459,597 B2 | 12/2008 | Koivusalmi et al. | |
| 7,491,858 B2 | 2/2009 | Murzin et al. | |
| 7,501,546 B2 | 3/2009 | Koivusalmi et al. | |
| 7,511,181 B2 * | 3/2009 | Petri et al. | 585/240 |
| 7,540,952 B2 | 6/2009 | Pinho et al. | |
| 7,550,634 B2 * | 6/2009 | Yao et al. | 585/240 |
| 7,754,931 B2 * | 7/2010 | Monnier et al. | 585/240 |
| 7,816,570 B2 * | 10/2010 | Roberts et al. | 585/240 |
| 2006/0186020 A1 * | 8/2006 | Gomes | 208/46 |
| 2006/0207166 A1 | 9/2006 | Herskowitz et al. | |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 * | 6/2007 | Koivusalmi et al. | 208/19 |
| 2007/0135316 A1 | 6/2007 | Koivusalmi et al. | |
| 2007/0135663 A1 | 6/2007 | Aalto et al. | |
| 2007/0135666 A1 | 6/2007 | Koivusalmi et al. | |
| 2007/0161832 A1 | 7/2007 | Myllyoja et al. | |
| 2007/0170091 A1 | 7/2007 | Monnier et al. | |

(Continued)

FOREIGN PATENT DOCUMENTS

CN 11270300 A 9/2008

(Continued)

*Primary Examiner* — N. Bhat
(74) *Attorney, Agent, or Firm* — Maryann Maas (57) ABSTRACT

A process has been developed for producing diesel boiling range fuel from renewable feedstocks such as plant and animal fats and oils. The process involves treating a renewable feedstock by hydrogenating and deoxygenating to provide a hydrocarbon fraction useful as a diesel boiling range fuel. Water is added to the deoxygenation reaction to drive carbon monoxide and water to react to form hydrogen and carbon dioxide. The hydrogen is then consumed by the reactions. If desired, the hydrocarbon fraction can be isomerized to improve cold flow properties.

25 Claims, 2 Drawing Sheets

U.S. PATENT DOCUMENTS

| | | |
|---|---|---|
| 2007/0175795 A1 | 8/2007 | Yao et al. |
| 2007/0260102 A1 * | 11/2007 | Santiago et al. ............. 585/733 |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077864 A1 | 3/2009 | Marker et al. |
| 2009/0077865 A1 | 3/2009 | Kalnes et al. |
| 2009/0077866 A1 | 3/2009 | Kalnes et al. |
| 2009/0077868 A1 | 3/2009 | Brady et al. |
| 2009/0078611 A1 | 3/2009 | Marker et al. |
| 2009/0082603 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0193709 A1 | 8/2009 | Marker et al. |

FOREIGN PATENT DOCUMENTS

| | | | |
|---|---|---|---|
| CN | 11343552 A | | 1/2009 |
| EP | 1396531 | * | 10/2004 |
| EP | 1719811 A1 | | 8/2006 |
| EP | 2046917 A | | 1/2008 |
| WO | WO 2007/064019 A1 | | 6/2007 |
| WO | WO 2007063874 A1 | | 6/2007 |
| WO | WO 2007064015 A1 | | 6/2007 |
| WO | WO 2007/125332 A1 | | 11/2007 |
| WO | WO 2007/141293 A1 | | 12/2007 |
| WO | WO 2008/012415 A2 | | 1/2008 |
| WO | WO 2008/020048 A2 | | 2/2008 |
| WO | WO 2008/053284 A1 | | 5/2008 |
| WO | WO 2008/101945 A1 | | 8/2008 |
| WO | WO 2008/105518 A1 | | 9/2008 |
| WO | WO 2008/119895 A2 | | 9/2008 |
| WO | WO 2008/141830 A1 | | 11/2008 |
| WO | WO 2008/141831 A1 | | 11/2008 |
| WO | WO 2008/151792 A1 | | 12/2008 |
| WO | WO 2008/152199 A1 | | 12/2008 |
| WO | WO 2009/004181 A2 | | 1/2009 |
| WO | WO 2009/011639 A2 | | 1/2009 |
| WO | WO 2009/013233 A2 | | 1/2009 |
| WO | WO 2009/020055 A1 | | 2/2009 |
| WO | WO 2009/025542 A1 | | 2/2009 |
| WO | WO 2009/059819 A1 | | 5/2009 |
| WO | WO 2009/059920 A2 | | 5/2009 |

* cited by examiner

PRODUCTION OF DIESEL FUEL FROM RENEWABLE FEEDSTOCKS WITH REDUCED HYDROGEN CONSUMPTION

CROSS-REFERENCE TO RELATED APPLICATION

This application claims priority from Provisional Application Ser. No. 60/973,818 filed Sep. 20, 2007, the contents of which are hereby incorporated by reference in its entirety.

FIELD OF THE INVENTION

This invention relates to a process for producing diesel boiling range fuel from renewable feedstocks such as the glycerides and free fatty acids found in materials such as plant and animal fats and oils. The process involves hydrogenation, decarboxylation, decarbonylation and hydrodeoxygenation followed by isomerization in one or more reactors. Water is added to the feedstock or the reaction mixture in order to generate hydrogen in situ for consumption in the hydrogenation and hydrodeoxygenation reactions.

BACKGROUND OF THE INVENTION

As the demand for diesel boiling range fuel increases worldwide there is increasing interest in sources other than crude oil for producing diesel boiling range fuel and fuel blending components. One such renewable source is what has been termed renewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these classes of compounds contain aliphatic carbon chains having from about 8 to about 24 carbon atoms. The aliphatic chains in the glycerides or FFAs can be fully saturated or can be mono-, di- or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises one or more steps to hydrogenate, decarboxylate, decarbonylate, (and/or hydrodeoxygenate) and optionally isomerize the renewable feedstock. The consumption of hydrogen in the hydrogenation and hydrodeoxygenation reaction zone may be a costly aspect of processing renewable feed stocks. Providing water in the reaction mixture results in hydrogen being generated in situ. The generated hydrogen may then be consumed in the hydrogenation and hydrodeoxygenation reactions.

SUMMARY OF THE INVENTION

A hydroconversion process for producing a diesel boiling range product from a renewable feedstock wherein the process comprises treating the renewable feedstock in a reaction zone in the presence of from about 5 mass-% to about 30 mass-% water and hydrogenating and deoxygenating the renewable feedstock at reaction conditions to provide a first reaction product comprising a hydrocarbon fraction comprising n-paraffins. The water is present in the reaction mixture as steam, and is therefore tolerable by the catalyst. Since the catalyst catalyzes the water gas shift reaction in addition to the hydrogenation and deoxygenation reactions, as soon as carbon monoxide is produced by the decarbonylation reaction, the carbon monoxide and water react via water gas shift to form carbon dioxide and hydrogen. The generated hydrogen is available for consumption in the hydrogenation and hydrodeoxygenation reactions. The diesel boiling range hydrocarbons are separated and collected. If an isoparaffin-rich diesel is desired, the water and carbon dioxide generated as byproducts in the first reaction zone are removed from the first reaction product in an integrated a hot high pressure stripper using hydrogen as the stripping gas. The hydrogen stripped first reaction product is introduced to a hydroisomerization reaction zone, and the isomerized product is recovered.

BRIEF DESCRIPTION OF THE DRAWINGS

FIG. 1 is a more simplistic schematic, while FIG. 2 is more detailed.

DETAILED DESCRIPTION OF THE INVENTION

As stated, the present invention relates to a process for producing a hydrocarbon stream useful as diesel boiling range fuel from renewable feedstocks originating from the fats and oils from plants or animals. The term renewable feedstock is meant to include feedstocks other than those derived from petroleum crude oil. Another term that has been used to describe this class of feedstocks is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, jatropha oil, tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The glycerides and FFAs of the typical vegetable or animal fat contain aliphatic hydrocarbon chains in their structure which have about 8 to about 24 carbon atoms. Mixtures of renewable feedstocks and hydrocarbons derived from petroleum crude oil may also be used as the feedstock. Mixtures of the above feedstocks may also be used. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what may have been considered to be a waste product from a petroleum based or other process into a valuable co-feed component to the current process.

Renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. The conditions at which the reactor is operated are well known in the art.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. application Ser. No. 11/770,826, hereby incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the first reaction zone, the feedstock is contacted with a hydrogenation or hydrotreating catalyst in the presence of hydrogen at hydrogenation conditions to hydrogenate the olefinic or unsaturated portions of the n-paraffinic chains. Hydrogenation and hydrotreating catalysts are any of those well known in the art such as nickel or nickel/molybdenum or cobalt/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation catalysts enumerated above are also capable of catalyzing decarboxylation, decarbonylation and/or hydrodeoxygenation of the feedstock to remove oxygen. Decarboxylation, decarbonylation, hydrodeoxygenation and hydrogenation are herein collectively referred to as deoxygenation reactions. Decarboxylation conditions include a relatively low pressure of about 3447 kPa (500 psia) to about 6895 kPa (1000 psia), a temperature of about 200° C. to about 400° C. and a liquid hourly space velocity of about 0.5 to about 10 $hr^{-1}$. In another embodiment the decarboxylation conditions include the same relatively low pressure of about 3447 kPa (500 psia) to about 6895 kPa (1000 psia), a temperature of about 288° C. to about 345° C. and a liquid hourly space velocity (based on fresh feed) of about 1 to about 4 $hr^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all three reactions occur simultaneously in one reactor or in one bed. Alternatively, the conditions can be controlled such that hydrogenation primarily occurs in one bed and decarboxylation, decarbonylation, and/or hydrodeoxygenation occurs in a second bed. Of course if only one bed is used, then hydrogenation occurs primarily at the front of the bed, while decarboxylation/hydrodeoxygenation occurs mainly in the middle and bottom of the bed. Finally, desired hydrogenation can be carried out in one reactor, while decarbonylation, decarboxylation and/or hydrodeoxygenation can be carried out in a separate reactor.

The hydrogenation and hydrodeoxygenation reactions consume hydrogen and produce water byproduct while the decarbonylation and decarboxylation reactions produce carbon monoxide and carbon dioxide. Hydrogen can be an expensive material to generate or purchase and so reducing and managing the hydrogen consumption provides an economic advantage. Adding or maintaining water, as steam, within a particular range in the reaction mixture takes advantage of the ability of the catalyst to catalyze the water gas shift reaction. As soon as carbon monoxide is generated by the decarbonylation reaction, the carbon monoxide reacts with the water via the water gas shift reaction to generate carbon dioxide and hydrogen. The newly generated hydrogen is available as a reactant in the hydrogenation and hydrodeoxygenation reactions. It is far more economical to provide water to the reaction mixture than it is to provide hydrogen to the reaction mixture, and capitalizing on the ability of the catalyst to catalyze the water gas shift reaction allows for the generation of reactant hydrogen in situ. Therefore, the overall cost of the process is reduced while maintaining the equivalent production of desired product.

At the operating conditions of the first reaction zone, the water will be present as vaporous water, or steam. When water is discussed herein, the term is mean to include vaporous water, i.e., steam. To generate hydrogen in situ in the first reaction zone, from about 0.1 mass-% to about 30 mass-% of the reaction mixture is provided or maintained as water. In another embodiment, the reaction mixture is from about 0.5 mass-% to about 25 mass-% water. In yet another embodiment, the reaction mixture is from about 1 mass-% to about 20 mass-% water. These ranges are measured as the mass-% of the total liquid feed to the reactor, including recycle if recycle is employed. The required water may be added to the feedstock, or may be added to the reaction mixture. It may be combined with the feedstock, introduced at the inlet of the first reaction bed, or it may be introduced at one or more interstage locations within the deoxygenation reaction zone, or both. Additionally, the water may be used as a quench at the inlet or at interstage locations of the deoxygenation reaction zone.

Most of the renewable feedstocks discussed herein do not contain appreciable levels of water, and there has been no previous need to add water to the renewable feedstocks or reaction mixtures. Proactively adding water to the renewable feedstock or reaction mixture to reach a stated range of water has unexpectedly reduced the hydrogen consumption of the overall deoxygenation process. At the conditions of the deoxygenation reaction zone and the amount of hydrogen already present it was not expected that the catalyst would successfully catalyze sufficient amounts of the water gas shift reaction for a reasonable amount of hydrogen to be generated. The water gas shift reaction is a reversible reaction, and the reaction mixture already contains hydrogen. Therefore, it was not expected that enough additional hydrogen would be generated to make an impact on the hydrogen consumption of the overall process. However, upon testing it was discovered that surprisingly, despite the hydrogen already present, the addition of water provided a ready reactant for the water gas shift reaction. Upon the generation of carbon monoxide in the presence of the water and the catalyst, the water gas shift reaction was catalyzed and carbon dioxide and hydrogen were produced, see the example below.

In addition to adding water to the feedstock or reaction mixture, in another embodiment it may be advantageous to influence a greater portion of the product to be formed through the decarbonylation and decarboxylation routes which do not consume hydrogen as opposed to through the hydrodeoxygenation route which does consume hydrogen. An overall cost savings is achieved. In this embodiment, from about 1100 to about 2500 ppm of a sulfur containing compound is added to the renewable feedstock or the reaction mixture of the deoxygenation zone. In yet another embodiment, from about 1500 to about 2500 ppm of a sulfur containing compound is added to the renewable feedstock or the reaction mixture of the deoxygenation zone. Suitable sulfur containing components include, but are not limited to, dimethyl disulfide, dibutyl disulfide, and hydrogen sulfide. The sulfur containing component may be part of the hydrogen stream such as hydrogen from hydrocracking units or hydrotreating units, or may be sulfur compounds removed from kerosene or diesel, and disulfide oils removed from sweetening units such as Merox™ units. As an added advantage, the sulfur containing component also operates to maintain the deoxygenation catalyst in a sulfided state, although much less sulfur is typically used to maintain the catalyst in a sulfided state. Greater than 1000 ppm of sulfur containing component is in excess of what is typically required to maintain the catalyst in a sulfided state, but unexpectedly operates to shift the ratio of competing reactions to those reactions which do not consume hydrogen.

Lower operating pressures also favorably drives the decarboxylation and decarbonylation reactions as compared to the hydrodeoxygenation reaction, thus reducing hydrogen consumption. The lower operating pressure achievable with one embodiment described below combined with either (1) addition of water to the renewable feedstock or reaction mixture or (2) sufficient addition of a sulfur containing compound or (3) both, even further reduces hydrogen consumption while still producing sufficient converted product.

The reaction product from the deoxygenation reactions will comprise a liquid portion and a gaseous portion. The liquid portion comprises a hydrocarbon fraction which is essentially all paraffins and having a large concentration of paraffins in the range of about 9 to about 18 carbon atoms. Different feedstocks will result in different distributions of paraffins. The gaseous portion comprises hydrogen, carbon dioxide, carbon monoxide, water vapor, propane and sulfur components such as hydrogen sulfide or phosphorous component such as phosphine.

In one embodiment, the effluent from the deoxygenation reactor is conducted to an optional hot high pressure hydrogen stripper. One purpose of the hot high pressure hydrogen stripper is to separate the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The temperature may be controlled in a limited range to achieve the desired separation and the pressure may be maintained at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C.

The effluent enters the hot high pressure stripper and the gaseous components, are carried with the hydrogen stripping gas and separated into an overhead stream. Additional hydrogen is used as the stripping gas. The remainder of the deoxygenation effluent stream is removed as hot high pressure hydrogen stripper bottoms and contains the liquid hydrocarbon fraction having components such as normal hydrocarbons having from about 8 to 24 carbon atoms. A portion of this liquid hydrocarbon fraction in hot high pressure hydrogen stripper bottoms may be used as the hydrocarbon recycle described below.

Hydrogen is a reactant in at least some of the reactions above, and to be effective, a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time.

In one embodiment, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1.

Although this hydrocarbon fraction is useful as a diesel boiling range fuel, because it comprises essentially n-paraffins, it will have poor cold flow properties. If it is desired to improve the cold flow properties of the liquid hydrocarbon fraction, then at least a portion of the hydrocarbon fraction can be contacted with an optional isomerization catalyst under isomerization conditions to at least partially isomerize the n-paraffins to branched paraffins. The effluent of the optional second reaction zone, the isomerization zone, is a branched-paraffin-rich stream. By the term "rich" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization can be carried out in a separate bed of the same reaction zone, i.e. same reactor, described above or the isomerization can be carried out in a separate reactor. For ease of description the following will address the embodiment where a second reactor is employed for the isomerization reaction. The hydrocarbon stream is contacted with an isomerization catalyst in the presence of hydrogen at isomerization conditions to isomerize the normal paraffins to branched paraffins. Only minimal branching is required, enough to overcome the cold-flow problems of the normal paraffins. Since attempting for significant branching runs the risk of high degree of undesired cracking, the predominant isomerized product is a mono-branched hydrocarbon.

The hydrogen stripped product of the deoxygenation reaction zone is contacted with an isomerization catalyst in the presence of hydrogen at isomerization conditions to isomerize the normal paraffins to branched paraffins. Only minimal branching is required, enough to overcome cold-flow problems of the normal paraffins. Since attempting for significant branching runs the risk of high degree of undesired cracking, the predominant isomerized product is a mono-branched hydrocarbon.

The isomerization of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. No. 5,981,419 and U.S. Pat. No. 5,908,134 teach a suitable bifunctional catalyst which comprises: (a) a porous crystalline material isostructural with beta-zeolite selected from boro-silicate (BOR-B) and boro-aluminosilicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art.

The final effluent stream, i.e. the stream obtained after all reactions have been carried out, is now processed through one or more separation steps to obtain a purified hydrocarbon stream useful as a diesel boiling range fuel. With the final effluent stream comprising both a liquid component and a gaseous component, various portions of which are to be recycled, multiple separation steps may be employed. For example, hydrogen may be first separated in an optional isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a stripping gas and to combine with the remainder as a bottoms stream. The bottoms stream is passed to the isomerization reaction zone and thus the hydrogen becomes a component of the isomerization reaction zone feed streams in order to provide the necessary hydrogen partial pressures for the reactor. The hydrogen is also a reactant in the deoxygenation reaction zone, and different renewable feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the final effluent after the optional removal of hydrogen still has liquid and gaseous components and is cooled, by techniques such as air cooling or water cooling and passed to a cold separator where the liquid component is separated from the gaseous component. Note that the final effluent may be (1) the product of the deoxygenation reaction zone, (2) the product of the deoxygenation reaction zone after processing through a hot high pressure hydrogen stripper, (3) the product of the deoxygenation reaction zone followed by the isomerization zone or (4) the product of the deoxygenation reaction zone followed by the hot high pressures hydrogen stripper followed by the isomerization zone. Suitable operating conditions of the cold separator include, for example, a temperature of about 45 to 50° C. and a pressure of 3850 kPa absolute (560 psia). A water byproduct stream is also separated. At least a portion of the water byproduct stream may be recycled to the renewable feedstock of the deoxygenation zone or to the deoxygenation zone itself as at least a portion of the required amount of water. At least a portion of the liquid component, after cooling and separating from the gaseous component, may be recycled back to the isomerization zone to increase the degree of isomerization if desired.

The liquid component contains the hydrocarbons useful as diesel boiling range fuel as well as smaller amounts of naphtha and LPG. The separated liquid component may be recovered as diesel boiling range fuel or it may be further purified in a product stripper which separates lower boiling components and dissolved gases from the diesel product containing $C_8$ to $C_{24}$ normal and mono-branched alkanes. Suitable operating conditions of the product stripper include a temperature of from about 20 to about 200° C. at the overhead and a pressure from about 0 to about 1379 kPa absolute (0 to 200 psia).

The LPG/Naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used as feed to a hydrogen production facility. Similarly, the naphtha may be used as feed to a hydrogen production facility.

The gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the isomerization zone, but if the carbon dioxide was not removed, its concentration would quickly build up and effect the operation of the isomerization zone. The carbon dioxide can be removed from the hydrogen by means well known in the art such as absorption with an amine, reaction with a hot carbonate solution, pressure swing absorption, etc. If desired, essentially pure carbon dioxide can be recovered by regenerating the spent absorption media.

Similarly, the sulfur containing component such as hydrogen sulfide is present to both maintain the sulfided state of the deoxygenation catalyst and to control the relative amounts of the decarboxylation and decarbonylation reactions as compared to hydrodeoxygenation reaction that are all occurring in the deoxygenation zone. The amount of sulfur is controlled to be sufficient to influence the ratios of the competing reactions and so must be removed before the hydrogen is recycled so that the sulfur containing components are recycled in the correct amount. The sulfur containing components may be removed using techniques such as adsorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide and the sulfur containing compound may be recycled to the reaction zone where hydrogenation primarily occurs and/or to any subsequent beds/reactors. The recycle stream may be introduced to the inlet of the reaction zone and/or to any subsequent beds/reactors. One benefit of the hydrocarbon recycle is to control the temperature rise across the individual beds. However, as discussed above, the amount of hydrocarbon recycle may be determined based upon the desired hydrogen solubility in the reaction zone which is in excess of that used for temperature control. Increasing the hydrogen solubility in the reaction mixture allows for successful operation at lower pressures, and thus reduced cost.

The following embodiment is presented in illustration of this invention and is not intended as an undue limitation on the generally broad scope of the invention as set forth in the claims. First the process is described in general as with reference to FIG. 1. Then the process is described in more detail with reference to FIG. 2. The embodiment illustrated in FIG. 1. employs the optional isomerization zone. The embodiment illustrated in FIG. 2. employs the optional hot high pressure hydrogen stripper, the optional isomerization zone, the optional isomerization zone effluent separator, and optional separations of the hydrocarbon fraction.

Figure 1:
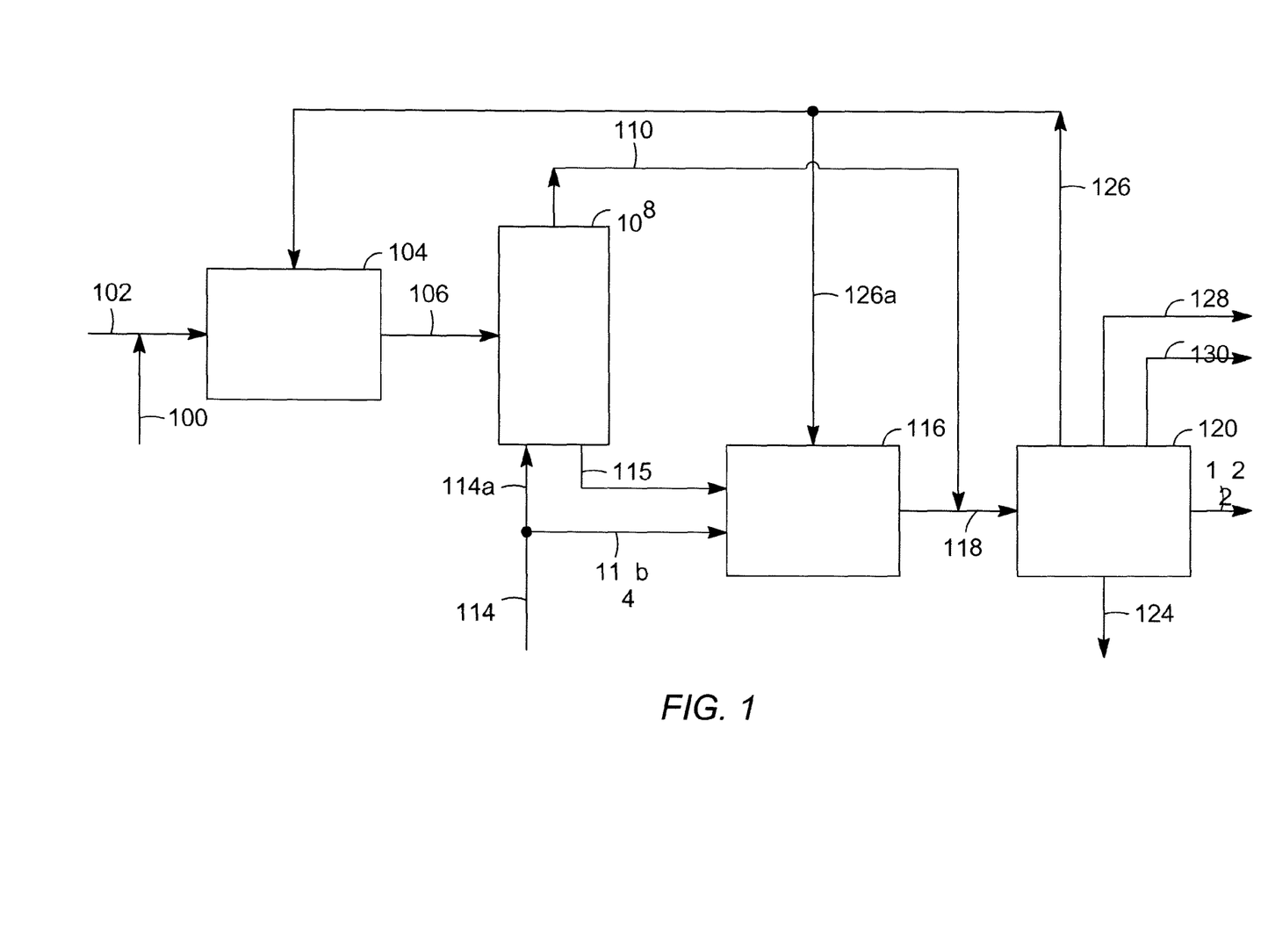
FIG. 1 and FIG. 2 are schematics of one embodiment of the invention.

Turning to FIG. 1 renewable feedstock 102 and water stream 100 are combined and introduced to deoxygenation reaction zone 104 along with recycle hydrogen 126. Deoxygenated product 106 is stripped in hot hydrogen stripper 108 using hydrogen 114a. Carbon oxides and water vapor are removed with hydrogen in overhead 110. Stripped deoxygenated product 115 is passed to isomerization zone 116 along with recycle hydrogen 126a and make-up hydrogen 114b. Isomerized product 118 is combined with overhead 110 and passed to product recovery zone 120. Carbon oxide stream 128, light ends stream 130, water byproduct stream 124, hydrogen stream 126, and branched paraffin-rich product 122 are removed from product recover zone 120. Branched paraffin-rich product 122 may be collected for use as diesel boiling range fuel and hydrogen stream 126 is recycled to both the deoxygenation reaction zone 104 and isomerization zone 116.

Figure 2:
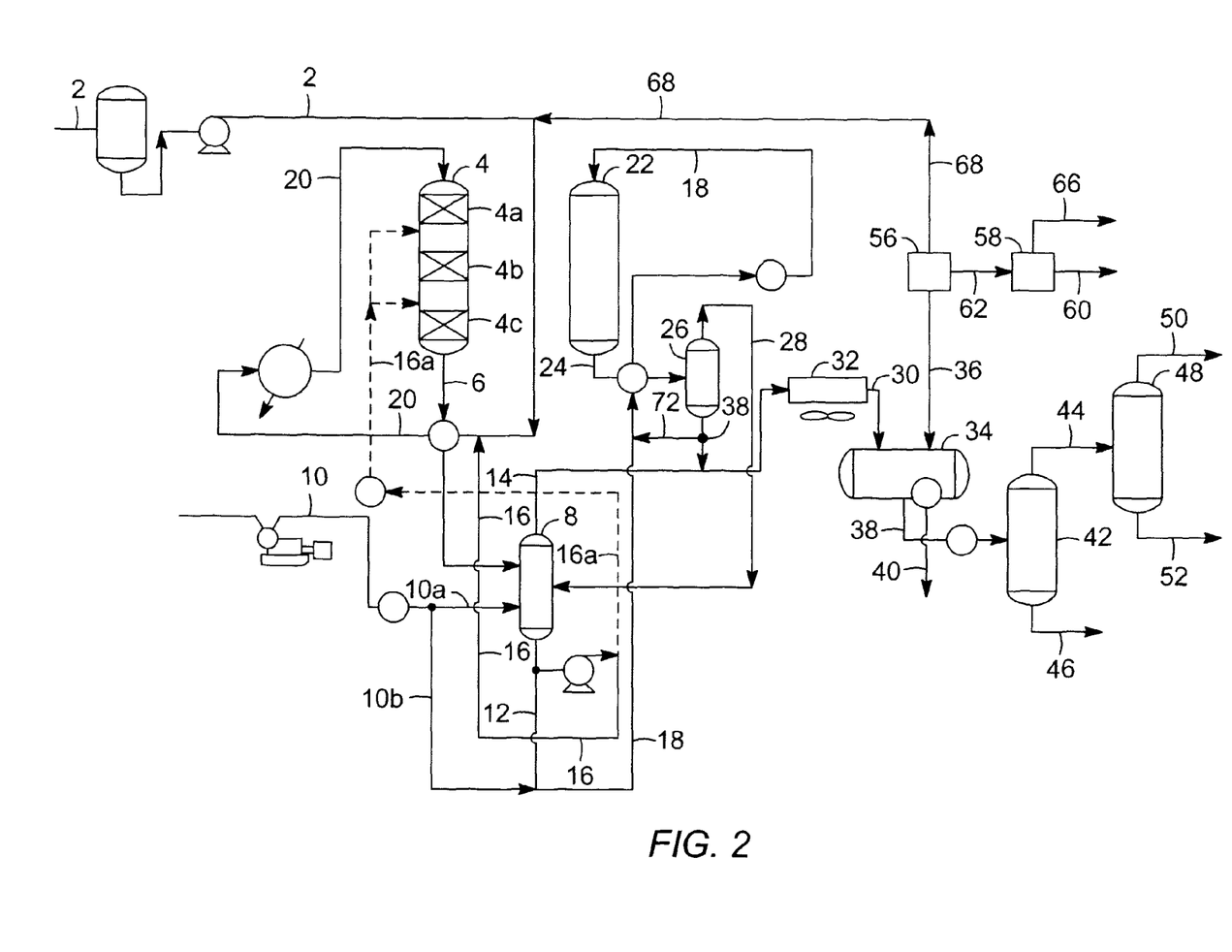

Turning to FIG. 2, the process begins with a renewable feedstock stream 2 which may pass through an optional feed surge drum. The feedstock stream is combined with recycle stream 16 to form combined feed stream 20, which is heat exchanged with reactor effluent and then introduced in combination with water stream 1 into deoxygenation reactor 4. The heat exchange may occur before or after the recycle is combined with the feed. Deoxygenation reactor 4 may contain multiple beds shown in FIG. 2 as 4a, 4b and 4c. Deoxygenation reactor 4 contains at least one catalyst capable of catalyzing decarboxylation, decarbonylation and hydrodeoxygenation of the feedstock to remove oxygen. Deoxygenation reactor effluent stream 6 containing the products of the deoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 6 is directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is stripped from the liquid component of deoxygenation reactor effluent 6 using make-up hydrogen 10a and recycle hydrogen 28. The gaseous component comprising hydrogen, vaporous water, carbon monoxide, carbon dioxide and possibly some propane, is separated into hot high pressure hydrogen stripper overhead stream 14. The remaining liquid component of deoxygenation reactor effluent 6 comprising primarily normal paraffins having a carbon number from about 8 to about 24 with a cetane number of about 60 to about 100 is removed as hot high pressure hydrogen stripper bottom 12.

A portion of hot high pressure hydrogen stripper bottoms forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and/or between beds 4b and 4c in order, or example, to aid in temperature control. The remainder of hot high pressure hydrogen stripper bottoms in stream 12 is combined with hydrogen stream 10b to form combined stream 18 which is routed to isomerization reactor 22. Stream 18 may be heat exchanged with isomerization reactor effluent 24.

The product of the isomerization reactor containing a gaseous portion of hydrogen and propane and a branched-paraffin-rich liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44 with the remainder, the diesel range components, being withdrawn from product stripper 42 in line 46. Stream 44 is introduced into fractionator 48 which operates to separate LPG into overhead 50 leaving a naphtha bottoms 52. Any of optional lines 72, 74, or 76 may be used to recycle at least a portion of the isomerization zone effluent back to the isomerization zone to increase the amount of n-paraffins that are isomerized to branched paraffins.

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 68 to be recycled to the first reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS104, HS115. Therefore the carbon dioxide passes through second amine scrubber zone 58 and into line 66. The amine may be regenerated which releases the hydrogen sulfide into line 60. Regenerated amine is then reused. Hydrogen sulfide in line 60 may be recycled to the deoxygenation reaction zone.

Example

Several experiments were conducted to demonstrate the effect of adding water to the renewable feedstock of the deoxygenation reaction zone described above. The renewable feedstock for all experiments as a 3:1 blend by volume of n-C16 and canola oil with 500 wt-ppm of sulfur as dibutyldisulfide added to the feedstock. A reactor was loaded with approximately 69 grams of a nickel and molybdenum on alumina catalyst. The first experiment (A) had no water added to the renewable feedstock. The other three experiments, (B), (C), and (D) had water added as steam at the specified rates added to the renewable feedstock.

As can be seen from the collected data in the Table the addition of water reduced the hydrogen consumption while maintaining the triglyceride conversion. The amount of carbon monoxide was reduced when water was added but the amount of carbon dioxide increased, which is consistent with an increase in the water gas shift reaction.

TABLE

| Test | (A) | (B) | (C) | (D) |
|---|---|---|---|---|
| Hours On Stream | 78 | 98 | 108 | 118 |
| Plant Pressure, kPa gauge (psig) | 3372(489) | 3372(489) | 3385(491) | 3372(489) |
| Temperature, ° C. (° F.) | 320(608) | 321(609) | 321(609) | 321(609) |
| LHSV, hr$^{-1}$ | 12 | 12 | 12 | 12 |
| H$_2$/HC, scfb | 1195 | 1194 | 1183 | 1183 |
| Water Addition | | | | |
| Vol H$_2$O/vol Feed, % | | 0.625 | 1.250 | 2.500 |
| Vol H$_2$O/vol Canola Oil, % | | 2.5 | 5.0 | 10.0 |
| % Triglyceride Conversion | 100.0 | 99.5 | 99.5 | 99.7 |
| Yield CO | 95 | 92 | 78 | 69 |
| Yield CO$_2$ | 64 | 65 | 82 | 86 |
| CO/CO$_2$ Ratio | 1.49 | 1.40 | 0.95 | 0.81 |
| Hydrogen Consumption, SCF/Bff | 1448 | 1376 | 1399 | 1406 |

The invention claimed is:

1. A process for producing a paraffin-rich diesel product from a renewable feedstock comprising:
   a) adding from about 0.1 to about 30 mass-% water to the feedstock or to a first reaction zone, wherein the mass-% water is measured as mass-% water of the total feed to the first reaction zone including any recycle;
   b) treating the feedstock and treating the water in the first reaction zone by hydrogenating and deoxygenating the feedstock and converting carbon monoxide and water to carbon dioxide and hydrogen using a catalyst at reaction conditions in the presence of hydrogen to provide a first reaction zone product stream comprising hydrogen, carbon dioxide, and a hydrocarbon fraction comprising n-paraffins having from about 8 to about 24 carbon atoms;
   c) separating the first reaction zone product stream to form
      i) a stream comprising hydrogen and carbon dioxide,
      ii) a stream comprising the hydrocarbon fraction, and
      iii) a water stream; and
   d) recovering the hydrocarbon fraction as product.

2. The process of claim 1 further comprising recycling a portion of the water stream to provide the water for step 1(a).

3. The process of claim 1 further comprising recycling a portion of the hydrocarbon fraction comprising a least the n-paraffins to the first reaction zone at a volume ratio of recycle to feedstock in the range of about 2:1 to about 8:1.

4. The process of claim 1 wherein the reaction conditions in the first reaction zone include a temperature of about 40° C. to about 400° C. and a pressure of about 689 kPa absolute (100 psia) to about 13,790 kPa absolute (2000 psia).

5. The process of claim 1 further comprising separating carbon dioxide from the stream comprising hydrogen and carbon dioxide and recycling the remaining hydrogen to the first reaction zone.

6. The process of claim 1 further comprising separating the hydrocarbon fraction into a diesel product stream and a naphtha and LPG stream and separating the naphtha and LPG stream into a naphtha stream and an LPG stream.

7. The process of claim 1 further comprising treating a petroleum derived hydrocarbon in the first reaction zone with the renewable feedstock.

8. The process of claim 1 further comprising pre-treating the feedstock in a pretreatment zone at pretreatment conditions to remove at least a portion of contaminants in the feedstock.

9. The process of claim 1 where the deoxygenating comprises at least one of decarboxylation and hydrodeoxygenation.

10. A process for producing a paraffin-rich diesel product from a renewable feedstock comprising;
   a) adding from about 0.1 to about 30 mass-% water to the feedstock or to a first reaction zone, wherein the mass-% water is measured as mass-% water of the total feed to the first reaction zone including any recycle;
   b) treating the feedstock and the water in the first reaction zone by hydrogenating and deoxygenating the feedstock and converting carbon monoxide and water to carbon dioxide and hydrogen using a catalyst at reaction conditions in the presence of hydrogen to provide a first reaction zone product stream comprising hydrogen, carbon dioxide, and paraffins having from about 8 to about 24 carbon atoms;
   c) separating, in a hot high pressure hydrogen stripper, the first reaction zone product stream into a gaseous stream comprising hydrogen and at least a portion of the water and carbon dioxide from the first reaction zone product stream and remainder stream comprising at least the paraffins;
   d) recycling a portion of the remainder stream to the first reaction zone;
   e) separating a combination of the gaseous stream and a portion of the remainder stream to provide:
      i) a stream comprising hydrogen and carbon dioxide
      ii) a stream comprising paraffins; and
      iii) a water stream; and
   f) recovering the stream comprising paraffins.

11. The process of claim 10 further comprising recycling a portion of the water stream to provide the water for step 10(a).

12. A process for producing a branched-paraffin-rich diesel product from a renewable feedstock comprising:
   a) adding from about 0.1 to about 30 mass-% water to the feedstock or to a first reaction zone, wherein the mass-% water is measured as mass-% water of the total feed to the first reaction zone including any recycle;
   b) treating the feedstock and the water in a first reaction zone by hydrogenating and deoxygenating the feedstock and converting carbon monoxide and water to carbon dioxide and hydrogen using a catalyst at reaction conditions in the presence of hydrogen to provide a first reaction zone product stream comprising hydrogen, carbon dioxide, and n-paraffins having from about 8 to about 24 carbon atoms;
   c) separating, in a hot high pressure hydrogen stripper, a gaseous stream comprising hydrogen and at least a portion of the water and carbon oxides from the first reaction zone product stream and introducing a remainder stream comprising at least the n-paraffins to a second reaction zone to contact an isomerization catalyst at isomerization conditions to isomerize at least a portion of the n-paraffins and generate a branched paraffin-rich stream;
   d) separating a combination of the branched paraffin-rich stream and the gaseous stream to provide:
      i) a stream comprising hydrogen and carbon dioxide;
      ii) a stream comprising branched paraffins, and iii) a water stream; and e) recovering the stream comprising branched paraffins.

13. The process of claim 12 further comprising recycling at least a portion of the water stream to provide the water for step 12(a).

14. The process of claim 12 further comprising removing at least a portion of the hydrogen from the branched paraffin-rich stream.

15. The process of claim 14 further comprising recycling the hydrogen removed from the branched paraffin-rich stream to the hot high pressure hydrogen stripper.

16. The process of claim 14 further comprising recycling the gaseous component to the first reaction zone.

17. The process of claim 12 further comprising recycling at least a portion of the branched paraffin-rich stream to the second reaction zone.

18. The process of claim 12 wherein the isomerization conditions in the second reaction zone include a temperature of about 40° C. to about 400° C. and a pressure of about 689 kPa absolute (100 psia) to about 13,790 kPa absolute (2000 psia).

19. The process of claim 12 wherein the hot high pressure hydrogen stripper is operated at a temperature of about 40° C. to about 300° C. and a pressure of about 689 kPa absolute (100 psia) to about 13,790 kPa absolute (2000 psia).

20. The process of claim 12 further comprising recycling a portion of the hydrocarbon fraction comprising a least the n-paraffins to the first reaction zone at a volume ratio of recycle to feedstock in the range of about 2:1 to about 8:1.

21. The process of claim 12 further comprising separating the stream comprising branched paraffins into a diesel product stream and a naphtha and LPG stream and separating the naphtha and LPG stream into a naphtha stream and an LPG stream.

22. The process of claim 12 wherein the isomerization conditions in the second reaction zone include a temperature of about 40° C. to about 400° C. and a pressure of about 689 kPa absolute (100 psia) to about 13,790 kPa absolute (2000 psia) and wherein the second reaction zone is operated at a pressure at least 345 kPa absolute (50 psia) greater than that of the first reaction zone.

23. The process of claim 12 further comprising treating a petroleum derived hydrocarbon in the first reaction zone with the renewable feedstock.

24. The process of claim 12 further comprising introducing a make up hydrogen stream to the hot high pressure hydrogen stripper.

25. The process of claim 12 further comprising combining a fresh hydrogen stream with the remainder stream.

* * * * *